United States Patent [19]

Neely

[11] 4,288,252
[45] Sep. 8, 1981

[54] METHOD OF MAKING LOW TEMPERATURE CURABLE SILICATE COMPOSITIONS

[75] Inventor: James E. Neely, Butler, Pa.

[73] Assignee: PPG Industries, Inc., Pittsburgh, Pa.

[21] Appl. No.: 142,492

[22] Filed: Apr. 21, 1980

Related U.S. Application Data

[63] Continuation of Ser. No. 973,479, Dec. 26, 1978, abandoned.

[51] Int. Cl.³ .............................. C09D 1/02; C09J 1/02
[52] U.S. Cl. .................................................. 106/74
[58] Field of Search ........................ 106/74, 84

[56] References Cited

U.S. PATENT DOCUMENTS

| | | | |
|---|---|---|---|
| 2,372,284 | 3/1945 | Moare | 428/443 |
| 2,662,022 | 12/1953 | Dietz | 106/74 |
| 3,178,299 | 4/1965 | Wilborn | 106/74 |
| 3,445,257 | 5/1969 | Hlock et al. | 106/84 |
| 3,454,410 | 7/1969 | Schutt | 106/74 |
| 3,639,276 | 2/1972 | Mueller | 106/74 |
| 3,930,876 | 1/1976 | Nakajima et al. | 106/74 |
| 3,943,231 | 3/1976 | Wasel-Nielen | 106/74 |
| 4,216,190 | 8/1980 | Neeley, Jr. | 423/314 |

*Primary Examiner*—O. R. Vertiz
*Assistant Examiner*—Mark Bell
*Attorney, Agent, or Firm*—Donna L. Seidel

[57] ABSTRACT

A method is disclosed for making low temperature curable silicate compositions.

4 Claims, No Drawings

METHOD OF MAKING LOW TEMPERATURE CURABLE SILICATE COMPOSITIONS

CROSS REFERENCE TO RELATED APPLICATION

This application is a continuation of U.S. application Ser. No. 973,479 filed Dec. 26, 1979, now abandoned.

FIELD OF THE INVENTION

The present invention relates generally to the art of inorganic silicate compositions and more particularly to the art of using inorganic phosphate curing agents in inorganic silicate compositions.

THE PRIOR ART

U.S. Pat. No. 3,445,257 to Hloch et al describes condensed aluminum phosphates used as hardeners for water glass cements. The condensed aluminum phosphates are prepared by subjecting aluminum ortho phosphates to a stepwise thermal treatment. The cements are prepared from potash or soda water glasses by mixing 90 to 100 parts filler with 4 parts hardener, and then adding 25 to 30 parts of water glass. A typical cement has a pot life of 30 minutes and then cures within 24 hours to form a mass that is resistant to acids and water.

U.S. Pat. No. 3,930,876 to Nakajima et al discloses an improved silica-phosphate type inorganic coating composition comprising a water soluble silicate and an inorganic phosphate pretreated with such silicate. The pretreatment is accomplished by mixing the phosphate, in powder form, with an aqueous solution of the silicate in a mechanical mill. Filler and/or pigment in amounts of 60 percent by weight or less based on the weight of the pretreated phosphate may be added during or after the pretreatment of the phosphate. About 60 to 150 parts by weight of the pretreated phosphate and 100 parts by weight of silicate are then mixed together to form a uniform composition, generally having a water content of ¼ to 2 parts by weight water per part of total solids.

SUMMARY OF THE INVENTION

The present invention provides a method for formulating inorganic compositions to be used as water-stable paints or cements which can be cured at relatively low temperatures. The method of the present invention involves milling or blending a mixture of inorganic curing agent, filler and alkali silicate. The water content of the mixture is varied to produce either a paint or a cementitious material. The aqueous compositions of the present invention are applied, dried and cured at relatively low temperatures and are useful in a wide variety of applications such as protective coatings for metal films on architectural spandrels, as solar collector coatings or as water-stable cements for joining glass panes in a multiple glazed window unit.

DESCRIPTION OF THE PREFERRED EMBODIMENT

Aqueous alkali metal or ammonium silicate compositions containing inorganic curing agents are prepared according to the method of the present invention as follows.

A mixture of inorganic curing agent and filler is milled in any typical mechanical mixer such as a ball mill, pebble mill or sand mill. The inorganic curing agent may comprise any of the variety of phosphate, borate or zincate curing agents which are useful for hardening silicate compositions, and preferably comprises the B-form of aluminum trimetaphosphate as disclosed in U.S. Pat. No. 4,216,190 which disclosure is incorporated herein by reference. Suitable fillers include numerous inorganic compounds which provide desirable properties such as mica, $TiO_2$ and $Cu(CrO_2)_2$.

The hardener is milled with an alkali silicate, preferably a mixture of sodium silicate and potassium silicate. Preferred sodium silicates have $SiO_2/Na_2O$ mole ratios between 3.1 and 4.0 while preferred potassium silicates have $SiO_2/K_2O$ mole ratios between 3.3 and 4.0. Preferred mixtures of alkali metal silicates comprise about 25 to 75 weight percent sodium silicate and 25 to 75 weight percent potassium silicate, although other cations such as lithium or ammonium may be present. As the ratio of silicon to metal in the silicate increases, higher silicate to curing agent ratios are preferred. The ratio of total silicate to curing agent is preferably above 2.5 by weight. The water content of the composition depends on the method of application of the composition as a paint or a cement. Prior to milling with the alkali silicate, the hardener is preferably neutralized with a base such as an alkali metal or ammonium hydroxide in order to prevent the formation of lumps when the acidic hardener is mixed with the alkaline silicate.

After application for its intended use, the composition is preferably air dried to remove the water and then cured, typically at temperatures of about 150° to 250° C. The cured composition is relatively nonporous and water stable, especially if a suitable mixture of alkali silicates is used.

The present invention will be further understood by the description of specific examples which follow.

EXAMPLE I

A cementitious composition is prepared as follows. A mixture of 100 grams of potassium silicate, 50 grams of sodium silicate and 45 grams of mica is placed in a one-liter ball mill and mixed with 10 milliliters of water for 5 minutes. The potassium silicate is a 29.1 percent aqueous solution of potassium silicate having a mole ratio of 3.9 $SiO_2/K_2O$. The sodium silicate is a 41.2 percent solution of sodium silicate having a mole ratio of 3.1 $SiO_2/K_2O$. A mixture of 29.7 grams of 50 percent aqueous solution of predominantly the B-form of aluminum trimetaphosphate and 4 milliliters of concentrated potassium hydroxide solution (1 gram KOH per gram of $H_2O$) is added to the silicate mixture in the ball mill. After 5 minutes of milling a uniform lump-free cementitious composition is obtained. The composition comprises 38 percent filler and has a silicate/phosphate ratio of 4. Curing for 30 minutes at 200° C. produces a hardened cement which does not soften upon soaking in water.

EXAMPLE II

A cementitious composition is prepared by milling together a mixture comprising 100 grams of potassium silicate, 50 grams of sodium silicate and 5 milliliters of water as in Example I and 40 grams of blue cobalt-/aluminum oxide pigment and a mixture of 19.8 grams of solid comprising aluminum metaphosphate and 3.5 milliliters of concentrated ammonium hydroxide. After ball milling, the composition can be applied as a cement or can be thinned with water for application as a paint.

Curing for several hours at 150° C. produces a hardened, water-stable composition.

EXAMPLE III

A cementitious composition is prepared comprising 100 grams of potassium silicate, 50 grams of sodium silicate, 50 grams of mica, 30 milliliters of water as in Example I and 19 grams of a curing agent solution containing 9.9 grams of aluminum metaphosphate. After 30 minutes of ball milling, a uniform lump-free cement having 42 percent filler and a silicate/phosphate ratio of 6 is obtained. The composition may be cured to a water stable condition in 30 minutes at 200° C.

EXAMPLE IV

A cementitious composition is prepared in the manner described in Example III from the following components: 20.9 grams of hardener solution containing 9.9 grams of aluminum metaphosphate, 133.3 grams of potassium silicate solution containing 38.8 grams of potassium silicate having a mole ratio of 3.92 $SiO_2/K_2O$, 63.4 grams of sodium silicate solution containing 20.6 grams of sodium silicate having a mole ratio of 3.85 $SiO_2/Na_2O$ and 30 grams of mica. The composition may be cured to a water-stable condition in 15 minutes at 250° C.

The above examples are offered to illustrate the present invention. Although the compositions described in detail have a consistency typical of cements, additional water may be added to lower the consistency to that typical of paints for application by conventional brushing, spraying or other techniques. The scope of the present invention is defined by the following claims.

I claim:
1. A method for making a waterstable composition from an aqueous silicate solution comprising a water soluble silicate and an inorganic curing agent which comprises the steps of:
    a. reacting an ammonia compound with aluminum dihydrogen phosphate to form a reaction product;
    b. heating said reaction product at a sufficient temperature for a sufficient time to produce predominantly B-form aluminum trimetaphosphate;
    c. combining said heated reaction product with a mixture of alkali metal silicates; and
    d. curing at a temperature between 150° C. and 250° C. until the composition is water stable.
2. The method according to claim 1, wherein the mixture of alkali metal silicates comprises from 25 to 75 percent by weight sodium silicate and from 25 to 75 percent by weight potassium silicate.
3. The method according to claim 2, wherein the sodium silicate has a mole ratio of $SiO_2/Na_2O$ between 3.1 and 4.0 and the potassium silicate has a mole ratio of $SiO_2/K_2O$ between 3.3 and 4.0.
4. The method according to claim 3, wherein the ratio of silicate to phosphate is at least 2.5:1 by weight.

* * * * *

UNITED STATES PATENT AND TRADEMARK OFFICE
CERTIFICATE OF CORRECTION

PATENT NO. : 4,288,252

DATED : September 8, 1981

INVENTOR(S) : James E. Neely, Jr.

It is certified that error appears in the above–identified patent and that said Letters Patent are hereby corrected as shown below:

In the Abstract, line 2, after "compositions", insert --by combining a mixture of sodium and potassium silicates with the B-form of aluminum trimetaphosphate--.

Signed and Sealed this

Eighth Day of December 1981

[SEAL]

Attest:

Attesting Officer

GERALD J. MOSSINGHOFF

Commissioner of Patents and Trademarks